United States Patent [19]

Kawachi et al.

[11] Patent Number: 4,898,452

[45] Date of Patent: Feb. 6, 1990

[54] APPARATUS FOR MOUNTING TARGET PLATE ON REFLECTOR FOR ELECTRONIC DISTANCE METER

[75] Inventors: Hideya Kawachi, Yokohama; Minoru Chiba, Isehara, both of Japan

[73] Assignee: Sokkisha Co., Ltd., Tokyo, Japan

[21] Appl. No.: 223,048

[22] Filed: Jul. 22, 1988

[30] Foreign Application Priority Data

Sep. 26, 1987 [JP] Japan ................................ 62-239966

[51] Int. Cl.⁴ ........................ G02B 5/12; G01L 15/02
[52] U.S. Cl. ........................................ 350/97; 33/293
[58] Field of Search ................ 350/97, 102, 103, 109; 33/293, 700, 707; 248/220.2, 223.4; 356/18, 20

[56] References Cited

U.S. PATENT DOCUMENTS 4,311,382 1/1982 Buckley et al. ........................ 356/5
4,343,550 8/1982 Buckley et al. ........................ 356/5
4,519,674 5/1985 Buckley et al. ...................... 350/102

FOREIGN PATENT DOCUMENTS 3431880 7/1985 Fed. Rep. of Germany ........ 33/293

Primary Examiner—Bruce Y. Arnold
Assistant Examiner—Ronald M. Kachmarik
Attorney, Agent, or Firm—Armstrong, Nikaido, Marmelstein, Kubovcik & Murray

[57] ABSTRACT

A target plate is mounted on a reflector body support unit by being slid into and engaged with guide grooves formed in the upstanding arms of the U-shape frame. Locking screws, each with a knob end manipulatable by hand and a forward enlarged end, are screwed into projection on pivotal shafts mounting the reflector and press against the target plate holding it in position.

6 Claims, 2 Drawing Sheets

APPARATUS FOR MOUNTING TARGET PLATE ON REFLECTOR FOR ELECTRONIC DISTANCE METER

BACKGROUND OF THE INVENTION

This invention relates to an apparatus for mounting a target plate on a reflector for electronic distance meter designed for facilitating collimation of the reflector which is for reflecting lights emitted from the electronic distance meter.

Conventionally, a reflector for electronic distance meter is provided with a distinctively colored target plate for the meter of facilitating collimation of the reflector. FIG. 5 illustrates an example thereof.

In the FIG. 5, a reflector body a is held in place by a holder c which is swingably supported on a U-shaped frame b fixed to a leveling base mounted on a tripod (not shown). A pair of projections e, e, each of which is provided with a screw hole d, are provided on the upper portion of the holder c. A target plate f is formed in an inverted U shape and provided with screw holes g on locations corresponding to those of the screw holes d so that the target plate may be fitted onto the reflector body a and the U-shaped frame b. The target plate is thus mounted and fitted on the reflector body a and the U-shaped frame and then fixed on the reflector by means of screws (not shown) inserted into the screw holes d and g.

According to the foregoing conventional apparatus, however, it is necessary to use a tool such as a screwdriver or the like for fixing the target plate f on the reflector by screws, so that inconveniences result such as more time required to complete the mounting and more likelihood of losing screws when the target plate f is removed from the reflector.

OBJECT AND SUMMARY OF THE INVENTION

An object of this invention is to provide, for mounting a target plate on a reflector for an electronic distance meter, an apparatus which is free of the aforementioned inconveniences.

In order to accomplish the foregoing object, according to the present invention, an apparatus for mounting a target plate on a reflector for an electronic distance meter, wherein a reflector body having a built-in prismatic reflection type optical member which reflects lights emitted from an electronic distance meter is supported by a support unit and a target plate for collimation is mounted on the support unit, is characterized in that vertically extending guide grooves are provided on the opposing locations on both the left and right sides of the support unit, an inverted U-shape target plate is slid in and engaged with the guide grooves, and there is screwed into the support unit a locking screw provided with a knob portion and will a fall-off check mechanism so that the target plate may be pressed by the tip of said locking screw and securely locked thereby onto the foregoing support unit.

The inverted U-shape target plate which is inserted in and engaged with the vertically extending grooves formed in the support unit is securely locked on the support unit when pressed thereto with the tip of the locking screw, and is unlocked therefrom when this locking pressure is released. This operation of the locking screw is carried out by means of the knob portion. Provided with a fall-off check mechanism, the locking screw will not come off accidentally from the support unit even when the target plate is removed from the support unit.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

Figure 1:
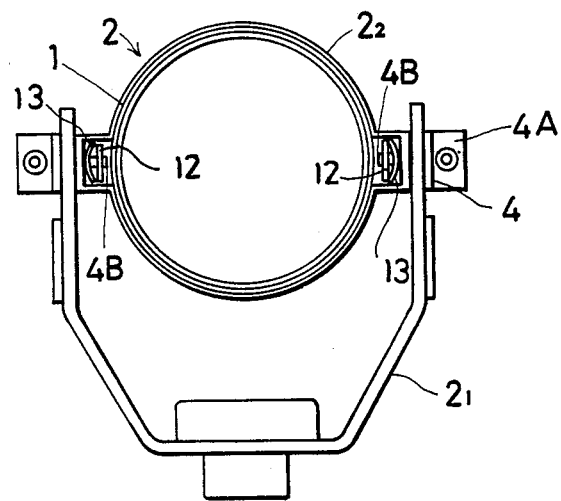
FIG. 1 is a front view of important portions of an embodiment according to this invention.
Figure 2:
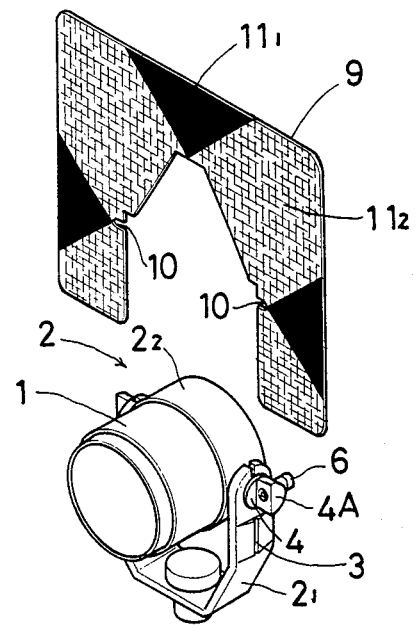
FIG. 2 is a perspective view thereof in which a target plate is detached.
Figure 3:
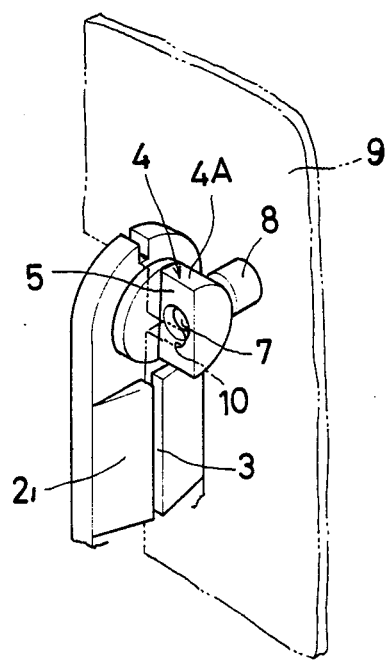
FIG. 3 is an enlarged, perspective view of important portions thereof.
Figure 4:
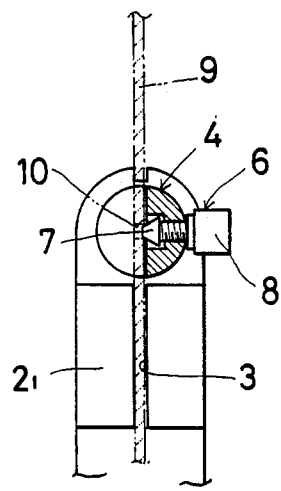
FIG. 4 is a sectional view of important portions thereof with a target plate attached thereto.
Figure 5:
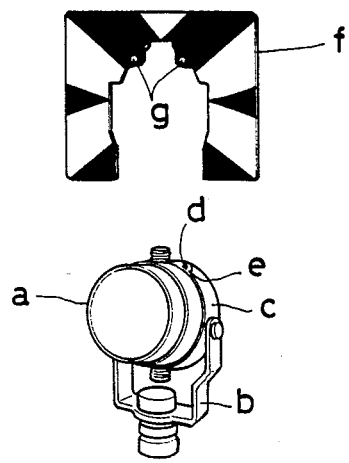
FIG. 5 is a perspective view of a conventional one with a target plate detached.

An example of embodiment of the present invention is explained with reference to the drawings as follows:

In FIGS. 1 through 4, a reflector body 1 is shown having a prismatic reflection type optical member built in. The reflector body 1 is swingably supported in position by a support unit 2. The support unit 2 comprises a U-shaped frame $2_1$ fixed to a leveling base (not shown) mounted on a tripod in the same manner as a conventional one, and a holder $2_2$ pivotally supported swingably on the U-shaped frame $2_1$. On the outer surfaces of both arms of the U-shaped frame $2_1$ are provided respectively side plates defining guide grooves 3 that extend vertically. Additionally, a notch can be fixed formed in the uppermost portion of each arms aligned with the respective groove 3. Pivotally supporting shafts 4 for the holder are fitted in the upper end portions of the arms of the frame.

Each shaft 4 is made up of a circular side plate and a smaller diameter portion 4B. The holder $2_2$ formed of a tubular body so designed as to fit onto the reflector body 1 has one end thereof closed with a closure plate and is fitted swingably on the smaller diameter portion 4B of each of the pivotally supporting shafts 4. Each smaller-diameter portion 4B extends through to the inner side of each of both the left and right arms of the U-shaped frame $2_1$. As shown in FIG. 1, the holder $2_2$ is pressed against the inner side of each arm of the U-shaped frame $2_1$ by the spring action of a bent spring 13 interposed between the inner side surface on each of the left and right sides thereof and a nut 12 screwed onto the smaller-diameter portion 4B of the pivotally supporting shaft 4 which pierces through the holder $2_2$, so that the holder $2_2$ can be swung on the smaller diameter portion 4B for any desired angle and yet held securely at any such angle by a frictional action generated therebetween. A projection 4A is provided on each shaft 4 projecting beyond the surface of each of the side plates of the shafts 4 and is a semiconductor shape having its bottom flat surface 5 aligned with an extension of the guide groove 3. A locking screw 6 is screwed into each projection 4A in such a manner that the screw 6 projects in the direction perpendicular to the bottom surface 5. The locking screw 6 has an enlarged portion 7 fixed to or formed on the forward end thereof and a large-diameter knob portion formed at the rear end thereof. The enlarged portion 7 tapers off towards its tip in a conical fashion so as to serve as a fall-off check mechanism. Each projection 4A is provided with a recess into which the enlarged portion 7 of the respective screw 6 fits when the screw 6 is screwed out.

A target plate 9 is formed to be of an inverted U-shape so as to be able to be mounted across the U-shaped frame $2_1$ and the holder $2_2$ and is provided on the inner edges of both the left and right side portions thereof with notches 10 which are to be engaged with the forward ends of the locking screws 6. The surface of the target plate 9 are shown to be divided into black-colored sections $11_1$ and yellow-colored sections $11_2$.

Both side portions of the target plate 9 are slid in and engaged with the guide grooves 3. Additionally, portions of the plate 9 can engage the notches. The knobs 8 of the locking screws 6 are turned by hand engaging the forward ends with the notches 10 pressing against the target plate 9, whereby the target 9 is locked onto the U-shaped frame $2_1$.

It should be noted that although the aforementioned target plate 9 is provided with notches 10, a target plate 9 can be fixedly locked in position even without the notches simply by pressure of the forward ends of the locking screws.

It should also be noted that the foregoing embodiment of this invention has a reflector body swingably mounted, the present invention is equally effectively applicable to one in which a reflector body is not swingable.

According to this invention as explained in the foregoing, certain advantages occur in that no tool such as a screwdriver or the like is required to attach the target plate to the support uni of the reflector body, thus reducing the time required to complete the attaching work and in that a possibility of losing or missing the screws is also eliminated.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for mounting a target plate on a reflector for an electronic distance meter, the reflector including a reflector body having a built-in prismatic reflection type optical member that reflects light emitted from an electronic distance meter, said apparatus comprising a support unit supporting the reflector body, the target plate being an inverted U-shape, means for engaging guide grooves extending vertically at opposing locations on both left and right sides of said support unit, the inverted U-shaped target plate being slid in and engaged with the guide grooves, and at least one locking screw provided with a knob portion and a fall-off check mechanism screwed into the support unit so that the target plate may be pressed by a forward end of the locking screw and thus locked onto the support unit.

2. The apparatus as claimed in claim 1, wherein said support unit comprises an upstanding U-shaped frame having two arms, and said means for engaging the vertically extending guide grooves comprises a pair of spaced apart side plates mounted on an outer surface of each of said arms.

3. The apparatus as claimed in claim 2, wherein an uppermost portion of each arm is provided with a notch, the target plate engaging said notches when mounted on said support unit.

4. The apparatus as claimed in claim 2, wherein said support unit further comprising a holder formed of a tubular body clampingly engaging the reflector body, and pivotal supporting shafts fitted in upper end portions of said arms and attached to said holder, each shaft having an outer end and a projection on said outer end of semicircular shape with a bottom flat surface aligned with an extension of one of the guide grooves.

5. The apparatus as claimed in claim 4, wherein two locking screws are provided, and each locking screw is screwed into one of said projections.

6. The apparatus as claimed in claim 5, wherein each of said projections has a recess in said bottom-flat surface and said fall-off check mechanism comprises an enlarged portion fixed to said forward end of each of said locking screws, each said enlarged portion being received in said recess of the respective projection when said screw is screwed out.

* * * * *